United States Patent

Omberg

[11] Patent Number: 5,996,623
[45] Date of Patent: Dec. 7, 1999

[54] HYDRAULIC DIRECTIONAL-CONTROL VALVE

[75] Inventor: Carl-Johan Omberg, Eskilstuna, Sweden

[73] Assignee: Nordwin AB, Sweden

[21] Appl. No.: 08/952,418

[22] PCT Filed: May 14, 1996

[86] PCT No.: PCT/SE96/00623

§ 371 Date: Feb. 17, 1998

§ 102(e) Date: Feb. 17, 1998

[87] PCT Pub. No.: WO96/36825

PCT Pub. Date: Nov. 21, 1996

[30] Foreign Application Priority Data

May 15, 1995 [SE] Sweden ................................. 9501794

[51] Int. Cl.⁶ .................................................. F15B 13/02
[52] U.S. Cl. .......................... 137/596.13; 91/31; 91/448; 137/625.69
[58] Field of Search ........................ 137/596.13, 625.69; 91/31, 448

[56] References Cited

U.S. PATENT DOCUMENTS 4,256,142  3/1981  Hancock .
4,655,250  4/1987  Jackson .
5,022,434  6/1991  Tsukimoto ...................... 137/596.13 X

FOREIGN PATENT DOCUMENTS 40 16 360 A1  5/1990  Germany .

*Primary Examiner*—Gerald A. Michalsky
*Attorney, Agent, or Firm*—Hill & Simpson

[57] ABSTRACT

A hydraulic directional-control valve comprises a first inlet part, a second inlet part, a tank port, a work part and a valve member which is movable from a neutral position to a operating position. In the neutral position, the valve member connects the first inlet port with the tank port and blocks the second inlet port. In the operating position, it blocks the first inlet port and connects the second inlet port with the work port. A third inlet port is provided and the valve member in the neutral position blocks the third inlet port and in the operating position connects it with the work port. The third inlet port may be supplied with hydraulic fluid in parallel with the second inlet port when an additional fluid flow is required.

4 Claims, 2 Drawing Sheets

HYDRAULIC DIRECTIONAL-CONTROL VALVE

BACKGROUND OF THE INVENTION

1. Field of the Invention

This invention relates to a hydraulic directional-control valve and, more particularly, a hydraulic directional-control valve of the kind defined in the precharacterising part of the independent claim.

2. Description of the Related Art

In a commonly used prior art embodiment of a directional-control valve of this kind, the valve member is a valve spool which is axially displaceable in a bore in a valve housing.

In the neutral position of the valve spool, an annular circumferential groove in the valve spool forms part of a flow path between one of the inlet ports and a tank port for discharging hydraulic fluid to a reservoir. At the same time, the valve spool blocks flow paths extending from the other inlet port to respective ones of a pair of user or work ports adapted for connection to a driven member, such as to opposite sides of a hydraulic motor, which may be a double-acting hydraulic cylinder, for example.

When the valve spool is displaced to either of two operating positions corresponding to respective operating directions of the hydraulic motor, a second annular circumferential groove in the valve spool forms part of a flow path between the second inlet port and one of the work ports, and a third annular circumferential groove in the valve spool forms part of a flow path between the other work port and the tank port. At the same time, the valve spool blocks the flow path between the first inlet port and the tank port.

In use of the valve, hydraulic fluid is fed to it from a pump which is connected to the two inlet ports by way of a flow divider. A first outlet of the flow divider is provided with a restrictor and connected to both inlet ports to make available at these ports a fluid flow the flow rate of which is determined by the restrictor. A second outlet of the flow divider opens to the reservoir by way of a valve which is controlled by the pump output pressure.

If the valve spool is in the neutral position, the pump feeds a fluid flow of a given flow rate to the first inlet port through the first flow divider outlet. This flow is passed to the reservoir without causing a substantial pressure drop between the first inlet port and the tank port. Because the valve spool blocks the first inlet port, no fluid flow is passed through that port. That portion of the fluid flow from the pump which is not passed through the first inlet port is discharged to the reservoir through the second flow divider outlet.

This embodiment of the prior art directional-control valve functions well as long as the flow rate to be handled by the valve is not substantially different from the flow rate for which the valve is designed. In many applications, however, the actual flow rate may differ substantially from the dimensioning flow rate and in such cases the control characteristics of the valve, in terms of flow-rate change versus displacement of the valve spool from the neutral position, are unsatisfactory.

An object of the invention is to provide a directional-control valve of the kind defined in the precharacterising part of the independent claim which may be optimized for two different operating flow rates and may be switched in a simple manner between two corresponding modes of operation.

In accordance with the invention this object is achieved by the construction of the valve set forth in the characterising part of the independent claim. Features of preferred embodiments of the valve are set forth in the dependent claims.

The invention will be described in greater detail below with reference to the accompanying drawings which show an embodiment by way of example.

DETAILED DESCRIPTION OF THE PREFERRED EMBODIMENTS

Figure 1:
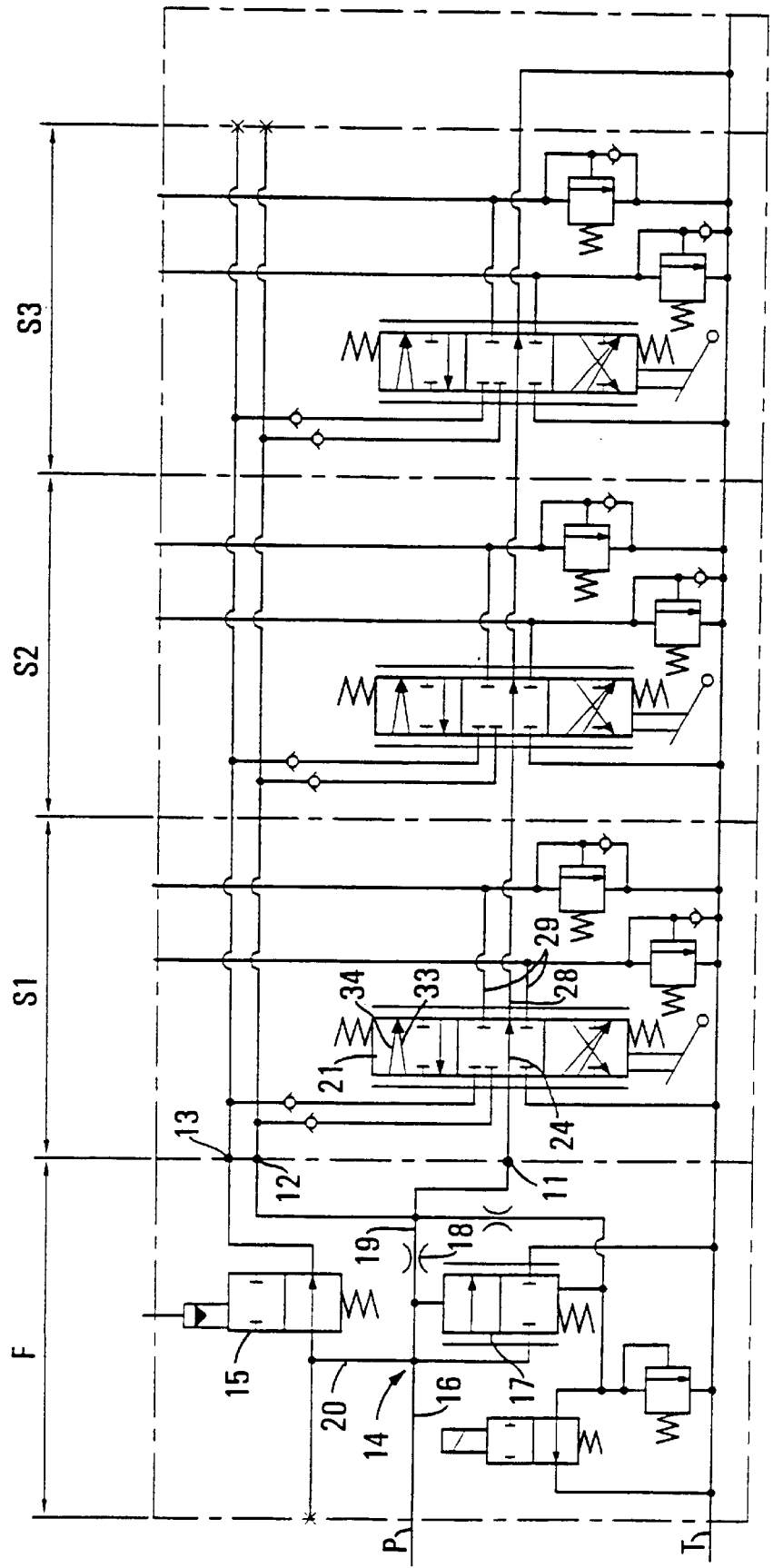
FIG. 1 is a diagram of a valve assembly comprising three control valves embodying the invention.

As illustrated in FIG. 1, the valve assembly comprises three identical spool control valve units S1, S2, S3 and an inlet unit F which is common to all three control valves and adapted to be connected to a pump at a pump port P and to a reservoir at a tank port T. Those ports at which the inlet unit F is connected to the group of control valve units, namely, at one side of the first control valve unit S1, are designated by 11, 12, 13. Accordingly, these ports are the outlet ports of the inlet unit F and the inlet ports of the control valve unit S1.

Main components of the inlet unit F are a flow divider, generally designated by 14, and a two-position shut-off valve 15.

As is known per se, the flow divider 14, the inlet 16 of which is connected to the pump port P, comprises a spool valve 17 and a restrictor 18. Its function is to divide a fluid flow from the pump port P into a first branch flow which is available at the inlet ports 11 and 12 and the flow rate of which is determined by the restrictor 18, and a second branch flow which is available at the inlet port 13. A passage 19 which connects the restrictor 18 to the inlet ports 11 and 12 may thus be regarded as a first outlet of the flow divider, while a passage 20 which connects the inlet 16 to the shut-off valve 15 may be regarded as a second outlet.

Figure 2:
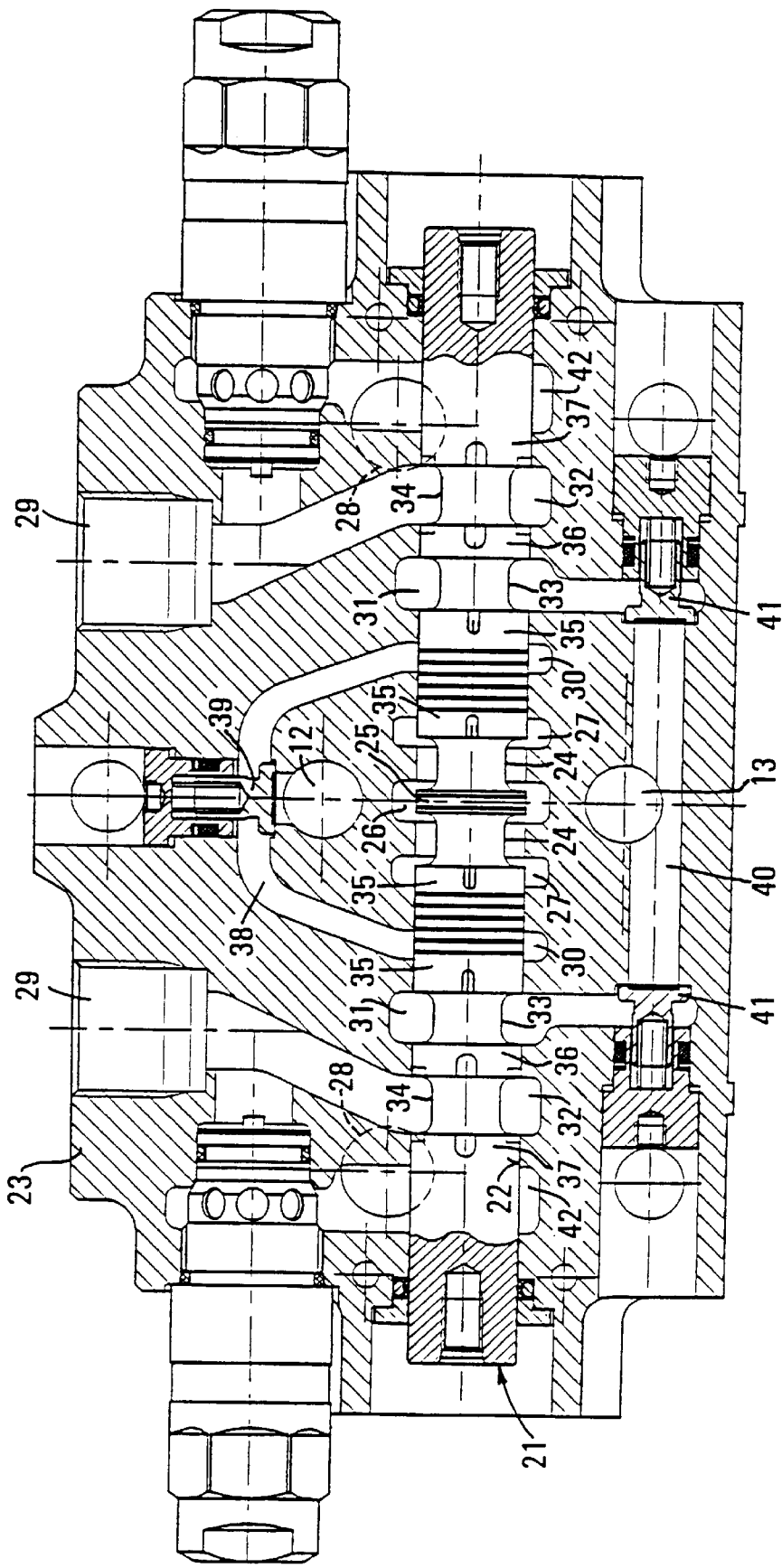
FIG. 2 is a longitudinal sectional view of one of the control valves of the valve assembly.

As already mentioned, the control valve units S1, S2 and S3 are identical and in the following description of the construction and operation of these valve units reference is therefore made primarily to the first unit S1. In FIG. 2, this unit is shown in a longitudinal sectional view in a plane containing the longitudinal axis of the valve spool.

As is well known, the valve spool 21 is axially displaceable in a bore 22 in the housing 23 of the valve unit, between a neutral position and either of two operating positions on opposite sides of the neutral position.

A pair of annular circumferential grooves 24 in the valve spool 21 are separated by an intervening land 25. Opposite to the land 25, a central housing recess 26 opens into the housing bore 22, and on opposite sides of the central housing recess 26 a pair of side recesses 27 in the housing similarly open into the housing bore 22. The central housing recess 26 is in constant open communication with the inlet port 11 by way of a hidden passage in the housing, and the side housing recesses 27 are in constant open communication with a tank port 28 by way of a housing passage which is also hidden.

When the valve spool 21 is in the neutral position—which is the position shown in FIG. 2—one of the valve spool grooves 24 connects the central housing recess 26 to the tank port 28 so that the hydraulic fluid supplied by the pump through the inlet port 11 is discharged, substantially without undergoing any pressure drop, directly through the thank port 28 and, by way of the other control valve units S2 and S3, to the reservoir.

If the valve spool is displaced to an operating position, the central valve spool land 25 in cooperation with one of the housing portions which define the housing bore 22 and separate the central housing recess 26 from the side housing recesses 27 will block the flow path between the inlet port 11 and the tank port 28. Instead, a flow path which is blocked in the neutral position will be opened between the inlet port 12, and thus also the inlet port 11, and one of two work ports 29 in the housing 23. These work ports are adapted to be connected to a load, such as opposite sides of a double-acting hydraulic cylinder or other hydraulic motor (not shown).

The last-mentioned flow path will comprise three housing recesses 30, 31 and 32 which open into the housing bore 22, and annular grooves 33 and 34 in the valve spool 21. Corresponding housing recesses and annular valve spool grooves are provided for the other operating position. The two annular grooves 33 and 34 in the valve spool are delimited axially by valve spool lands 35, 36 and 37 which cooperate with the housing portions separating the housing recesses 30, 31 and 32 and a further housing recess to be described below, to control the fluid flow between the housing recesses.

The housing recesses 30 are connected to the inlet port 12 by way of a housing passage 38 and an non-return valve 39. In a corresponding manner the housing recesses 31 are connected to the inlet port 13 by way of a housing passage 40 and two non-return valves 41. The housing recesses 32 are in constant open communication with respective ones of the user ports 29.

On the outer side of each housing recess 32 a further housing recess 42 is provided which opens into the housing bore 22 and is in constant open communication with the tank port 28.

When the valve spool 21 is in an operating position, the annular valve spool groove 33 forms part of an open fluid flow path between the housing recess 30 and the housing recess 31, and at the same time the annular circumferential valve spool groove 34 forms part of an open flow path between the housing recess 31 and the housing recess 32. Hydraulic fluid can then flow from the inlet port 12 and, if the valve 15 is in the illustrated open position, from the inlet port 13 to one of the user ports 29. At the same time hydraulic fluid can flow from the other user port 29 to the adjacent housing recess 42 and to the reservoir through one of the tank ports 28.

Consequently, when the valve 15 is open, the control valve unit S1 can process the entire fluid flow delivered by the pump through the flow divider 14. If, on the other hand, the valve 15 is closed only the fluid flow provided at the restricted flow divider outlet 19 is available.

The control of that portion of the fluid flow which enters through the inlet port 12 when the valve 15 is open and the control of the total fluid flow are effected separately by means of different parts of the valve spool, namely the valve spool land 35 and the valve spool land 36, respectively.

These parts can therefore be optimized separately, i.e. both for the limited fluid flow from the restricted flow divider outlet 19 and for the total fluid flow.

The shut-off valve 15 may be operated in any suitable manner. It should also be noted that the supply of hydraulic fluid to the inlet port 13, which in the illustrated example is effected by the flow divider 14 through the valve 15, can be effected in other ways, e.g. by means of a separate pump.

I claim:

1. A hydraulic directional-control valve comprising:

a first inlet port;

a second inlet port;

a tank port;

a work port; and a valve member having an opening which is movable from a neutral position to an operating position and which in the neutral position forms a fluid pathway from the first inlet port to the tank port and blocks the second inlet port and in the operating position blocks an opening to the first inlet port and forms a fluid pathway from the second inlet port to the work port said hydraulic valve further comprising a third inlet port wherein the valve member in the neutral position blocks an opening to the third inlet port and in the operating position connects the opening with the work port.

2. A directional-control valve according to claim 1, comprising an inlet unit with a flow divider, said flow divider having an inlet, which is connected with a pump port on the inlet unit, and a first outlet for connecting the inlet unit to the first inlet port and the second inlet port and further comprising a second outlet on the flow divider for connecting the inlet unit to the third inlet port.

3. A directional-control valve according to claim 2, comprising a shut-off valve inserted in the second flow divider outlet, said shut-off valve in the closed portion blocking the second flow-divider outlet.

4. A directional-control valve according to any one of claims 1 to 3, in which the valve member is a valve spool which is axially displaceable in a bore of a valve housing and provided with a plurality of axially spaced-apart control lands and valve spool recesses separating the lands, in which the housing is provided with a number of axially spaced-apart housing recesses which open into the housing bore and are separated by intervening housing portions, in which the inlet ports, the work port and the tank port communicate with the housing recesses, and in which the control lands of the spool cooperate with said intervening housing portions to control the flow of hydraulic fluid between, the inlet ports and, the work port and the tank port wherein one of the lands of a pair of neighbouring spool control lands whose intervening valve spool recess communicates with a first one of the housing recesses that communicates with one of the second and third inlet ports controls the flow of hydraulic fluid between that inlet port and the work port while the other control land of the second pair of lands controls the flow of hydraulic fluid between the first housing recess and the other of said inlet ports.

\* \* \* \* \*